(12) United States Patent
Shibutake et al.

(10) Patent No.: US 10,124,838 B2
(45) Date of Patent: Nov. 13, 2018

(54) UNDERFLOOR STRUCTURE OF AUTOMOTIVE VEHICLE

(71) Applicant: MAZDA MOTOR CORPORATION, Hiroshima (JP)

(72) Inventors: Nobuyuki Shibutake, Higashihiroshima (JP); Nobuyuki Nakayama, Aki-gun (JP); Koji Yoshitake, Hiroshima (JP); Akihiro Kawano, Hiroshima (JP); Masafumi Aburame, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/154,628

(22) Filed: May 13, 2016

(65) Prior Publication Data
US 2016/0339970 A1 Nov. 24, 2016

(30) Foreign Application Priority Data
May 19, 2015 (JP) .................................. 2015-101467

(51) Int. Cl.
*B62D 35/00* (2006.01)
*B62D 35/02* (2006.01)
(Continued)

(52) U.S. Cl.
CPC ........... *B62D 35/005* (2013.01); *B62D 25/16* (2013.01); *B62D 25/2036* (2013.01); *B62D 35/02* (2013.01); *Y02T 10/88* (2013.01)

(58) Field of Classification Search
CPC ........ B62D 25/16; B62D 25/20; B62D 35/00; B62D 35/001; B62D 35/005; B62D 35/02
(Continued)

(56) References Cited

U.S. PATENT DOCUMENTS 8,276,973 B2 * 10/2012 Hasegawa ............... B62D 25/16
296/180.1
8,517,451 B2 * 8/2013 Kakiuchi ............... B62D 35/02
296/180.1
(Continued)

FOREIGN PATENT DOCUMENTS

EP 1674381 A1 6/2006
EP 2607215 A2 6/2013
(Continued)

OTHER PUBLICATIONS

English translation of EP 2 607 215; retrieved Aug. 8, 2017 via PatentTranslate located at www.epo.org.*
(Continued)

*Primary Examiner* — Jason S Daniels
(74) *Attorney, Agent, or Firm* — Studebaker & Brackett PC

(57) ABSTRACT

A deflector comprises a protrusion portion which protrudes downward, including a slant face portion slanting obliquely rearward and downward, and a vertical wall portion which is provided in back of the protrusion portion to extend in a vehicle width direction. A lower end portion of the vertical wall portion is positioned at a lower level than a rear end portion of the slant face portion. The lower end portion of part of the vertical wall portion located inward from the other part of the vertical wall portion located so as to overlap the front wheel in a front view is positioned at a higher level than the lower end portion of the other part of the vertical wall portion located so as to overlap the front wheel in the front view.

10 Claims, 11 Drawing Sheets

(51) Int. Cl.
*B62D 25/20* (2006.01)
*B62D 25/16* (2006.01)

(58) Field of Classification Search
USPC .......................................... 296/180.1, 180.2
See application file for complete search history.

(56) References Cited

U.S. PATENT DOCUMENTS

| | | | |
|---|---|---|---|
| 9,352,792 B2* | 5/2016 | Ito | B62D 25/18 |
| 2015/0015026 A1 | 1/2015 | Nojima et al. | |
| 2015/0225026 A1* | 8/2015 | Ohira | B62D 25/08 |
| | | | 296/180.1 |
| 2015/0266522 A1* | 9/2015 | Ishikawa | B62D 35/02 |
| | | | 296/180.1 |
| 2017/0144636 A1* | 5/2017 | Schmidt | F16D 65/847 |

FOREIGN PATENT DOCUMENTS

| | | | |
|---|---|---|---|
| JP | 2007-090976 A | 4/2007 | |
| JP | 2013-166432 A | 8/2013 | |

OTHER PUBLICATIONS

A2Mac1, Automotive Benchmarking, screenshots of BMW 1-series from 2013 Frankfurt Auto Show, Sep. 2013, retrieved from portal.a2mac1.com on May 22, 2018.

* cited by examiner

UNDERFLOOR STRUCTURE OF AUTOMOTIVE VEHICLE

BACKGROUND OF THE INVENTION

The present invention relates to an underfloor structure of an automotive vehicle which comprises a deflector provided under a floor and in front of a front wheel.

In general, it is known to regulate traveling air coming into a front wheel house by a deflector so as to reduce an airflow flowing out of the front wheel house toward a vehicle-body side face, thereby reducing the aerodynamic resistance of a vehicle (see European Patent Application Publication No. 1674381 A1).

Herein, it is also known that a traveling-air guide is provided in front of the deflector in order to reduce the air resistance which is generated when the traveling air directly hits against a vertical wall of the deflector (see European Patent Application Publication No. 2607215 A2, for example).

The inventors of the present invention have found that there still exits an airflow which flows out from below a vehicle floor near the front wheel house, thereby disturbing a vehicle's rear airflow, despite an existence of the deflector. This is a flow of the air in an engine room which unavoidably leaks out from a gap generated around a front suspension member.

SUMMARY OF THE INVENTION

An object of the present invention is to provide an underfloor structure of an automotive vehicle which can properly reduce the air (aerodynamic) resistance of the vehicle despite the above-described leakage of the air from the engine room.

The present invention is an underfloor structure of an automotive vehicle, comprising a deflector provided in front of a front wheel house accommodating a front wheel therein to protrude downward from a vehicle-body lower face so as to control traveling air flowing into the front wheel house, wherein the deflector comprises a protrusion portion which protrudes downward, including a slant face portion slating obliquely rearward and downward, and a vertical wall portion which is provided in back of the protrusion portion to extend in a vehicle width direction, and the vertical wall portion of the deflector is configured such that a lower end portion thereof is positioned at a lower level than a rear end portion of the slant face portion of the protrusion portion, the lower end portion of part of the vertical wall portion which is located inward, in the vehicle width direction, from another part of the vertical wall portion which is located so as to overlap the front wheel in a front view being positioned at a higher level than the lower end portion of the above-described other part of the vertical wall portion located so as to overlap the front wheel in the front view.

According to the present invention, in an area facing the front of the front wheel (i.e., at the position located so as to overlap the front wheel in the front view), the slant face portion of the deflector guides the traveling air in such a manner that the traveling air flows downward and then hits against the vertical wall portion, so that turbulence of the air overflowing the deflector can be made properly small, thereby reducing the air resistance which may be caused by this turbulence. Meanwhile, in another area which is located inward, in the vehicle width direction, from the above-described area facing the front of the front wheel (i.e., at the position located inward, in the vehicle width direction, from the above-described position located so as to overlap the front wheel in the front view), the traveling air which has been guided downward by the slant face portion of the deflector can easily flow over the vertical wall portion of the deflector, without generating any improperly-large turbulence, because the wall height of the vertical wall portion in this area is relatively small (i.e., the lower end portion of this part of the vertical wall portion is positioned at the higher level than the lower end portion of the above-described other part of the vertical wall portion located so as to overlap the front wheel in the front view). Consequently, this traveling air straightly flows rearward on the inward side, in the vehicle with direction, of the front wheel accommodated in the wheel house, without decreasing its flowing speed. A flowing speed of the air leaking out of an engine room is slower than that the above-described traveling air guided downward by the slant face portion, so that the air leaking out of the engine room is sucked to the traveling air guided downward by the slant face portion, thereby joining with this traveling air and then flowing rearward together with this traveling air. Accordingly, this air leaking out of the engine room can suppress occurring of an airflow flowing out from below the vehicle floor in back of the wheel house, so that any turbulence of an airflow which flows on a vehicle-body side face can be properly suppressed. As a result, reducing of the air resistance and suppressing of the turbulence can be compatibly achieved.

Herein, it may be preferable that the above-described lower end portion of the part of the vertical wall portion located inward, in the vehicle width direction, from the other part of the vertical wall portion located so as to overlap the front wheel in the front view be positioned at a close level to the rear end portion of the slant face portion of the protrusion portion.

In an embodiment of the present invention, the above-described protrusion portion includes a curve-shaped outer wall which is configured to curve, retreating from an inward side thereof to an outward side thereof, and forms a periphery of the slant face portion.

According to this embodiment, part of the traveling air flowing down in the area facing the front of the front wheel can be smoothly guided outward and then rearward by the curve-shaped outer wall.

In another embodiment of the present invention, a sheet of splash shield covers the front wheel house and a portion of the vehicle-body lower face which is positioned in front of the front wheel house, and the protrusion portion is connected to a lower face of a front portion of the splash shield at a peripheral portion thereof so as to form a space portion between the splash shield and the protrusion portion.

According to this embodiment, the strength of the protrusion portion (against an impact from below or the like) can be properly improved.

In another embodiment of the present invention, an undercover covers a lower face of a vehicle-body floor which is positioned in back of the front wheel house, and the undercover includes a recess portion extending rearward at a front portion thereof which faces the front wheel house, the recess portion being configured such that a portion of the undercover which is located inward, in the vehicle width direction, from the front wheel is partially recessed upward.

According to this embodiment, since the above-described recess portion causes a decreased of a local pressure of the under-flower airflow, the above-described joined airflows of the traveling air guided downward by the slant face portion and the air leaking out of the engine room are drawn to this recess portion, so that this recess portion becomes a flow passage of the joined airflows. Accordingly, the above-described suppression of the occurrence of the airflow flowing out can be achieved surely.

Herein, it may be preferable that an outward side, in the vehicle width direction, of the recess portion is partitioned by a lower portion of a side sill extending in a vehicle longitudinal direction. Thereby, the above-described prevention of the airflow flowing out can be achieved more surely.

Other features, aspects, and advantages of the present invention will become apparent from the following description which refers to the accompanying drawings.

DETAILED DESCRIPTION OF THE INVENTION

Hereafter, an embodiment of the present invention will be described specifically referring to the accompanying drawings. The drawings show an underfloor structure of an automotive vehicle, and FIG. 1 is a bottom view of the automotive vehicle provided with the present underfloor structure, FIG. 2 is a bottom view of the automotive vehicle in a state in which right-and-left undercovers are removed from a state shown in FIG. 1, FIG. 3 is a main-part sectional view taken along line A-A of FIG. 1, and FIG. 4 is a sectional view taken along line B-B of FIG. 1.

Figure 1:
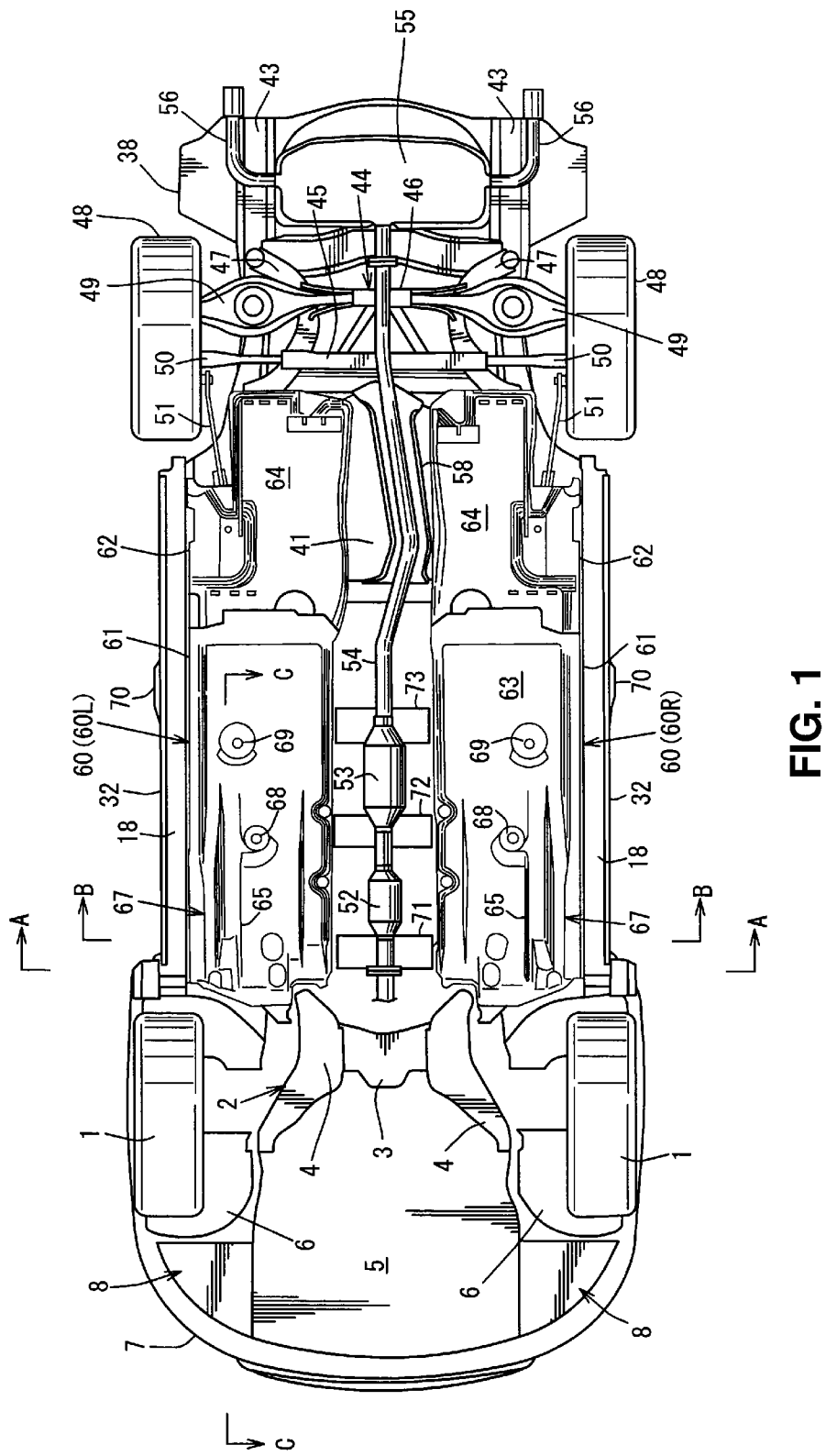
FIG. 1 is a bottom view of an automotive vehicle provided with an underfloor structure of the present invention.
Figure 2:
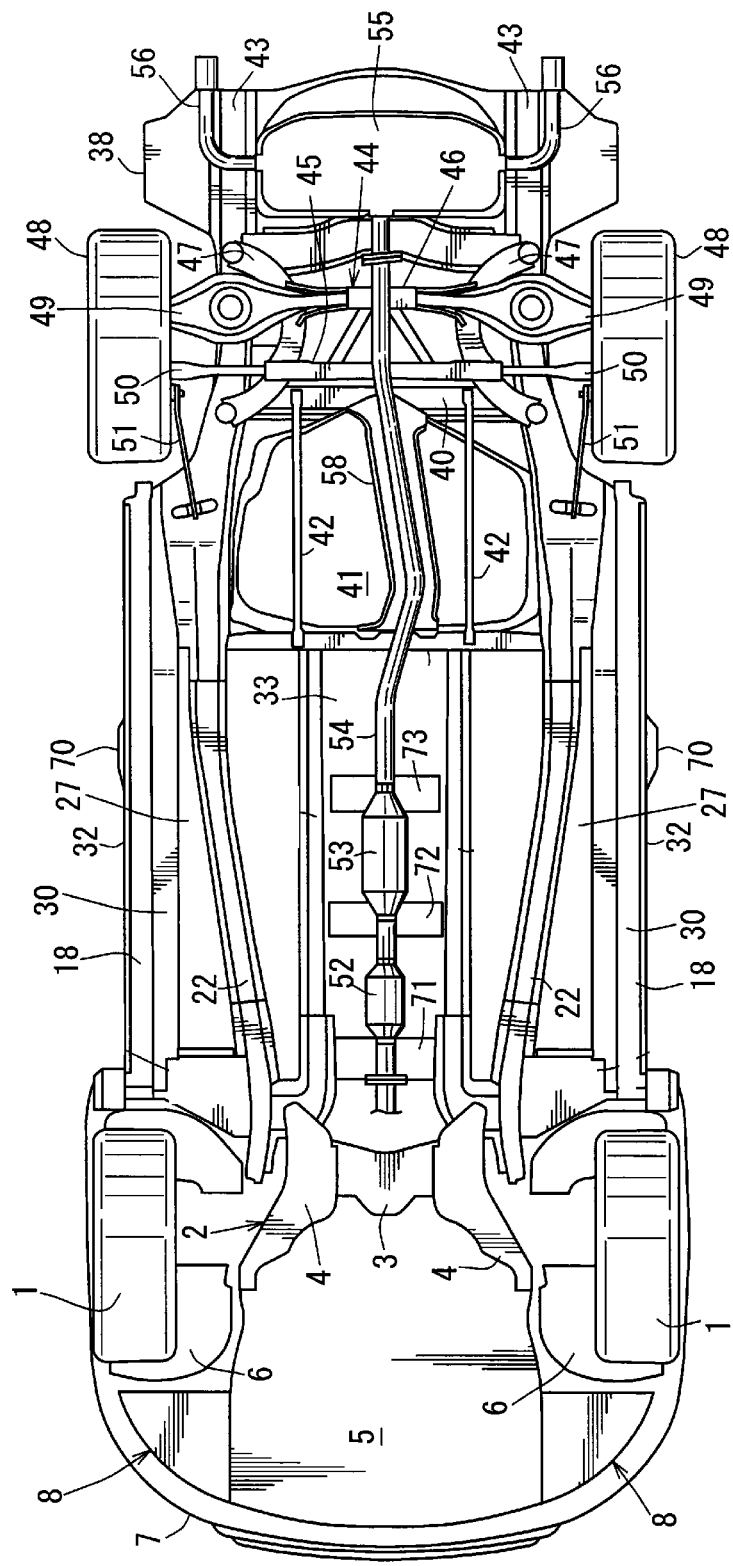
FIG. 2 is a bottom view of the automotive vehicle in a state in which right-and-left undercovers are removed from a state shown in FIG. 1.
Figure 3:
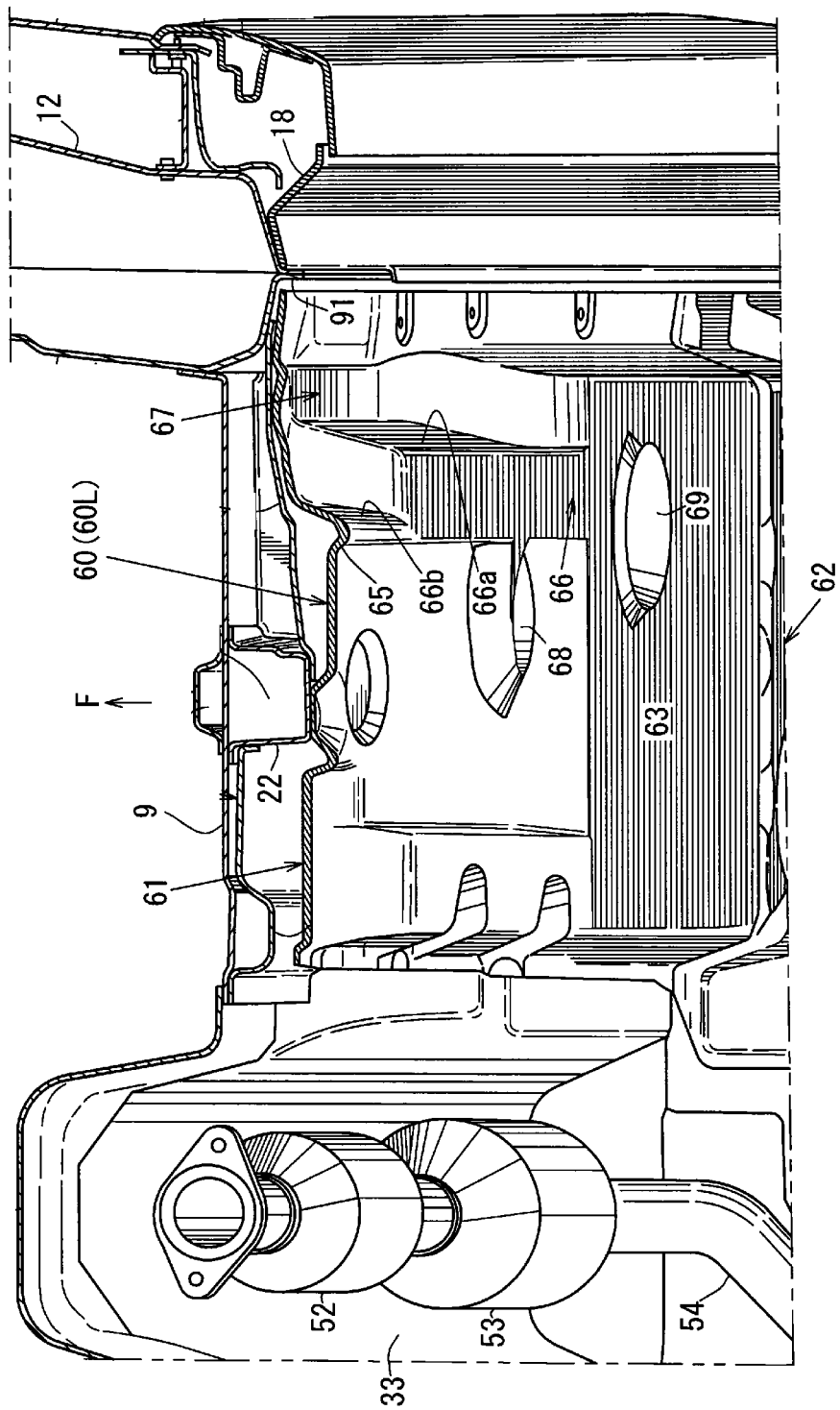
FIG. 3 is a main-part sectional view taken along line A-A of FIG. 1.

As shown in FIGS. 1 and 2, a sub frame 2 for mounting an engine and for attaching a front suspension to suspend a front wheel 1 is provided at a lower portion of an engine room. The sub frame 2 comprises a front cross member (not illustrated) which extends in a vehicle width direction at a front position, a rear cross member 3 which extends in the vehicle width direction at a rear position, and right-and-left side members 4, 4 which extend in a vehicle longitudinal direction.

As shown in FIGS. 1 and 2, the lower portion of the engine room is covered with an undercover 5, and a deflector 8 is provided at a triangular area which is enclosed by a lower end portion of a splash shield (a so-called mudguard) for the front wheel 1, a side end portion of the undercover 5, and a side portion of a front bumper 7, i.e., at a portion below a vehicle floor which is positioned in front of the front wheel 1.

Figure 4:
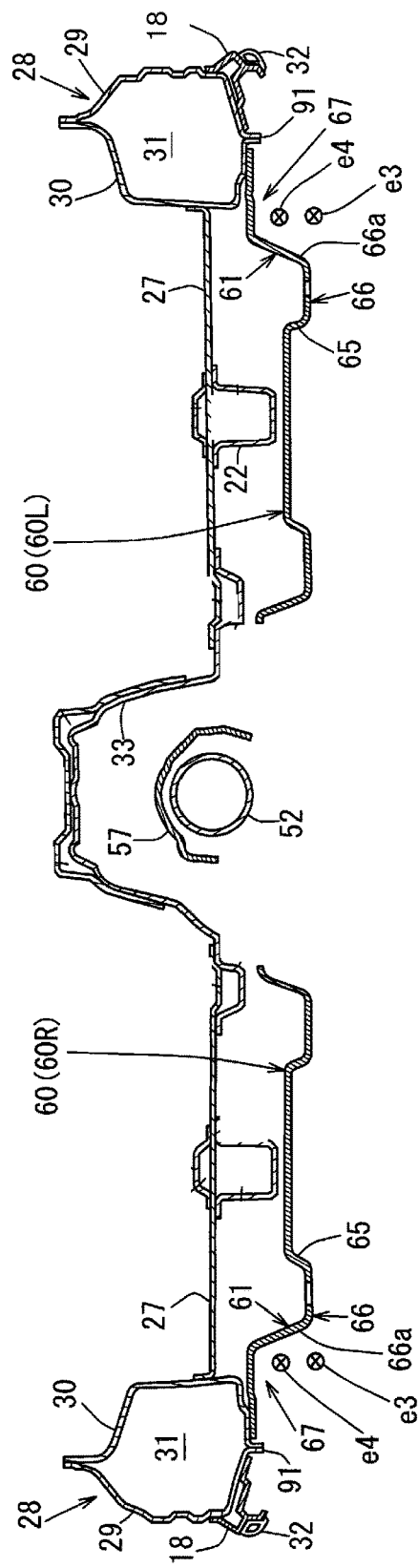
FIG. 4 is a sectional view taken along line B-B of FIG. 1.

As shown in FIG. 4, a floor panel 27 which forms a floor of a cabin is provided in back of a toe board 9, and side sills 28 are provided at both end portions, in the vehicle width direction, of the floor panel 27. The side sill 28 is a vehicle-body reinforcing member which has a side-sill closed cross section 31 extending in the vehicle longitudinal direction, which is formed by a side sill outer 29 and a side sill inner 30 which are provided with their upper-and-lower joint flange portions fixedly joined together. A side sill cover 18 is provided at an outward side, in the vehicle width direction, of a lower portion of the side sill outer 29, and a molding member 32 extending in the vehicle longitudinal direction is provided at an outward side, in the vehicle width direction, of a lower portion of the side sill cover 18.

Herein, as shown in FIG. 1, a pair of undercovers 60, 60 to control (regulate) traveling air flowing under a vehicle floor are provided below the vehicle floor at respective positions between the front wheel 1 and a rear wheel 48, i.e., at right-and-left positions of a lower face of a tunnel portion 33 in the present embodiment.

Figure 5:
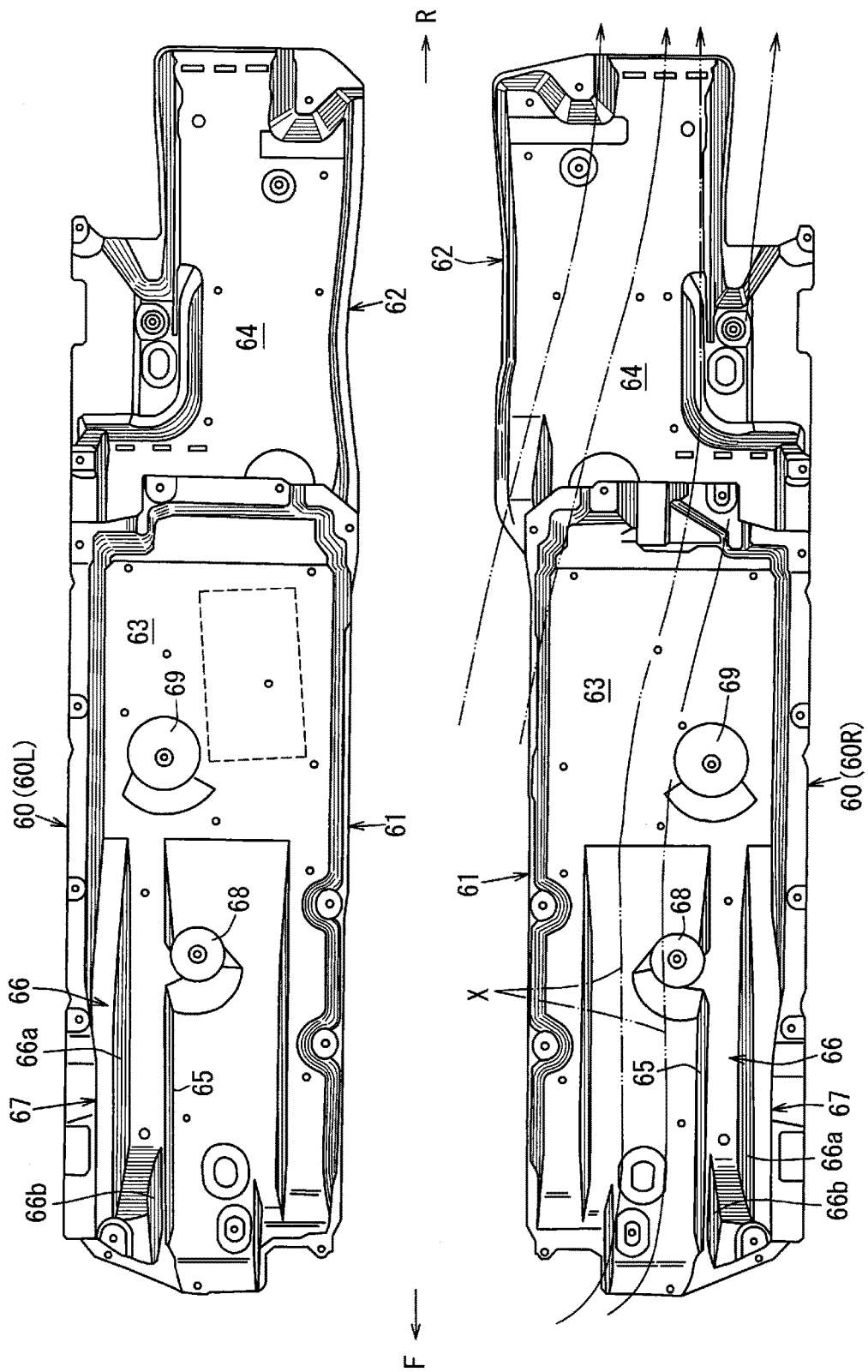
FIG. 5 is a bottom view of the undercovers.
Figure 6:
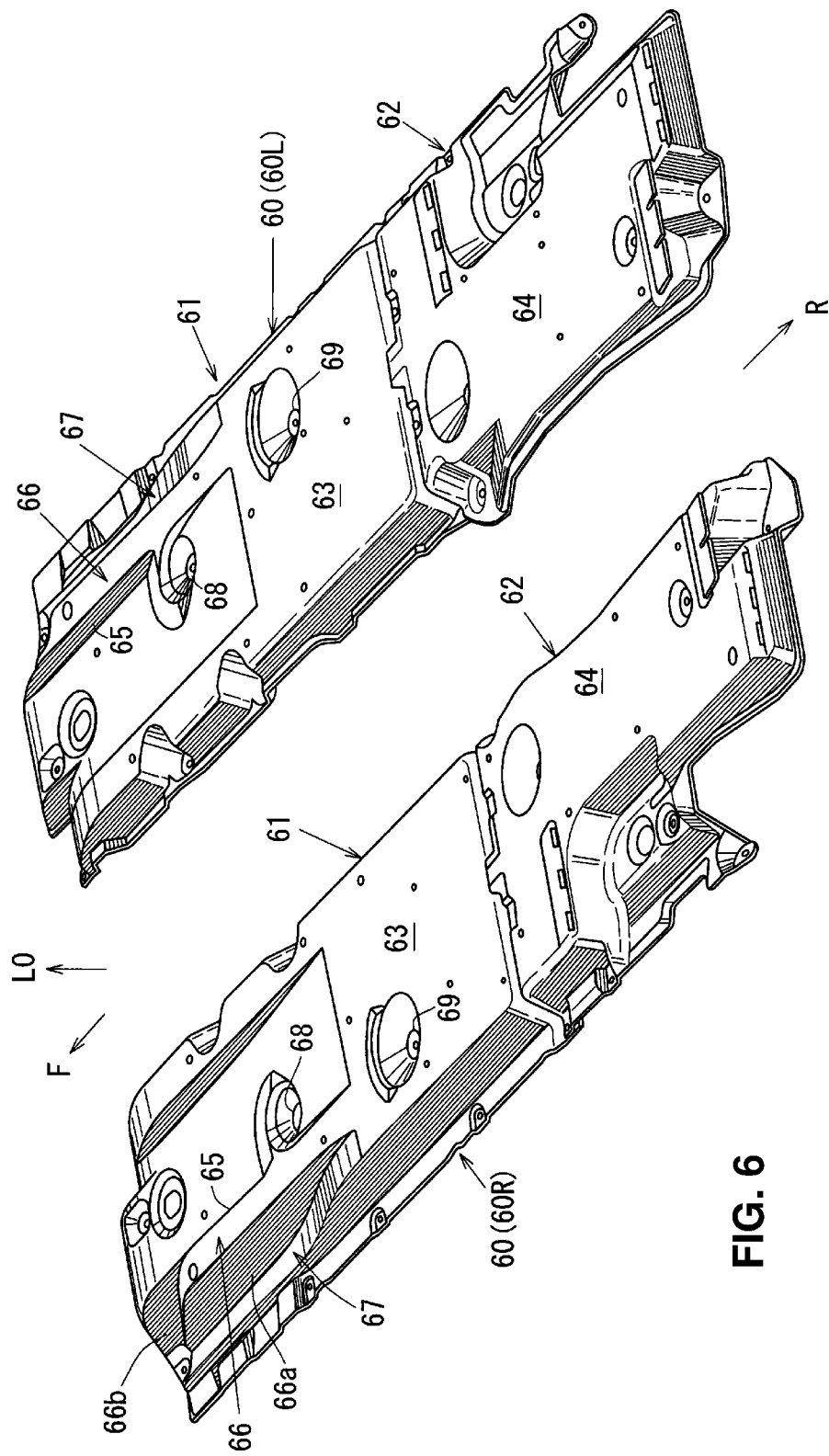
FIG. 6 is a perspective view of the undercovers, when viewed from below.

FIG. 5 is a bottom view of the undercovers, and FIG. 6 is a perspective view of the undercovers, when viewed from below. Herein, the undercover 60 illustrated on an upper side in FIG. 5 is a left-side undercover 60L, and the undercover 60 illustrated on a lower side in FIG. 5 is a right-side undercover 60R. These undercovers 60L, 60R are configured to be substantially symmetric.

The above-described undercovers 60, 60 cover the vehicle floor (see the floor panel 27) from below as shown in FIG. 1. In the present embodiment, the undercover 60 comprises two members of a front-side member 61 and a rear-side member 62, which are formed integrally along the vehicle longitudinal direction.

Further, in the present embodiment, a main part of the above-described undercover is made from nonwoven fabric. Specifically, the nonwoven fabric is impregnated with resin as a binder, or the nonwoven fabric is laminated with a rubber sheet or a resin sheet, which are pressed and fixed together.

As shown in FIGS. 5 and 6, the undercover 60 includes floor faces 63, 64 as a roughly flat airflow-straightening face extending in the vehicle longitudinal direction at its front-side and rear-side members 61, 62, respectively, and at a front portion of the floor face 63 of the front-side member 61 is provided a vertical wall 65 which extends in the vehicle longitudinal direction so as to prevent (regulate) an under-floor airflow X from flowing outward at a front-half part of the vehicle.

As shown in FIG. 4, the above-described vertical wall 65 is constituted by a side wall positioned on the inward side of a recess-shaped vertical wall portion 66 which is configured such that part of the front-side member 61 is recessed downward and extends in the vehicle longitudinal direction. Further, this vertical wall 65 is, as shown in FIG. 6, configured such that it extends over about a half of the longitudinal length (whole length) of the front-side member 61 and the vertical length of the vertical wall 65 gradually decreases toward its rear end from its middle portion. This is because an effect of the above-described prevention (regulation) of the underfloor airflow X in a further rearward area from this point is rather small.

As shown in FIG. 3, a side wall 66a of the above-described vertical wall portion 66 which is positioned on the outward side is configured such that its front end portion 66b is close to the above-described vertical wall 65, and the undercover 69 includes a recess portion 67 extending rearward at a portion of the front-side member 61 which is positioned on the outward side of the side wall 66a and the front end portion 66b. That is, the recess portion 67 is configured such that the portion of the front-side member 61 of the undercover 60 which is positioned on the outward side of the side wall 66a and the front end portion 66b is partially recessed upward. Herein, as shown in FIGS. 3, 5 and 6, reference characters 68, 69 denote attachment portions for attaching the front-side member 61 of the undercover 60 to a floor frame lower 22 shown in FIG. 2. In FIGS. 1 and 2, reference character 70 denotes a center pillar, and reference characters 71, 72 and 73 denote cross members which provided on the outward side (lower side) of the tunnel portion 33.

Further, in the figures, reference character 38 denotes a rear floor, reference character 40 denotes a rear cross member, reference character 41 denotes a fuel tank, reference character 42 denotes a tank-fixing band, reference character 43 denotes a rear side frame, reference character 44 denotes a sub frame for attaching a rear suspension device, reference character 45 denotes a front cross member, reference character 46 denotes a rear cross member, reference character 47 denotes a side member, and reference characters 49, 50, 51 respectively denote a lower arm, a toe control link, and a trailing arm which are members of the rear suspension device. Additionally, reference characters 52, 53 denote catalysts, reference character 54 denotes an exhaust pipe, reference character 55 denotes a silencer, reference character 56 denotes a tail pipe, and reference characters 57, 58 denote insulators.

Figure 7:
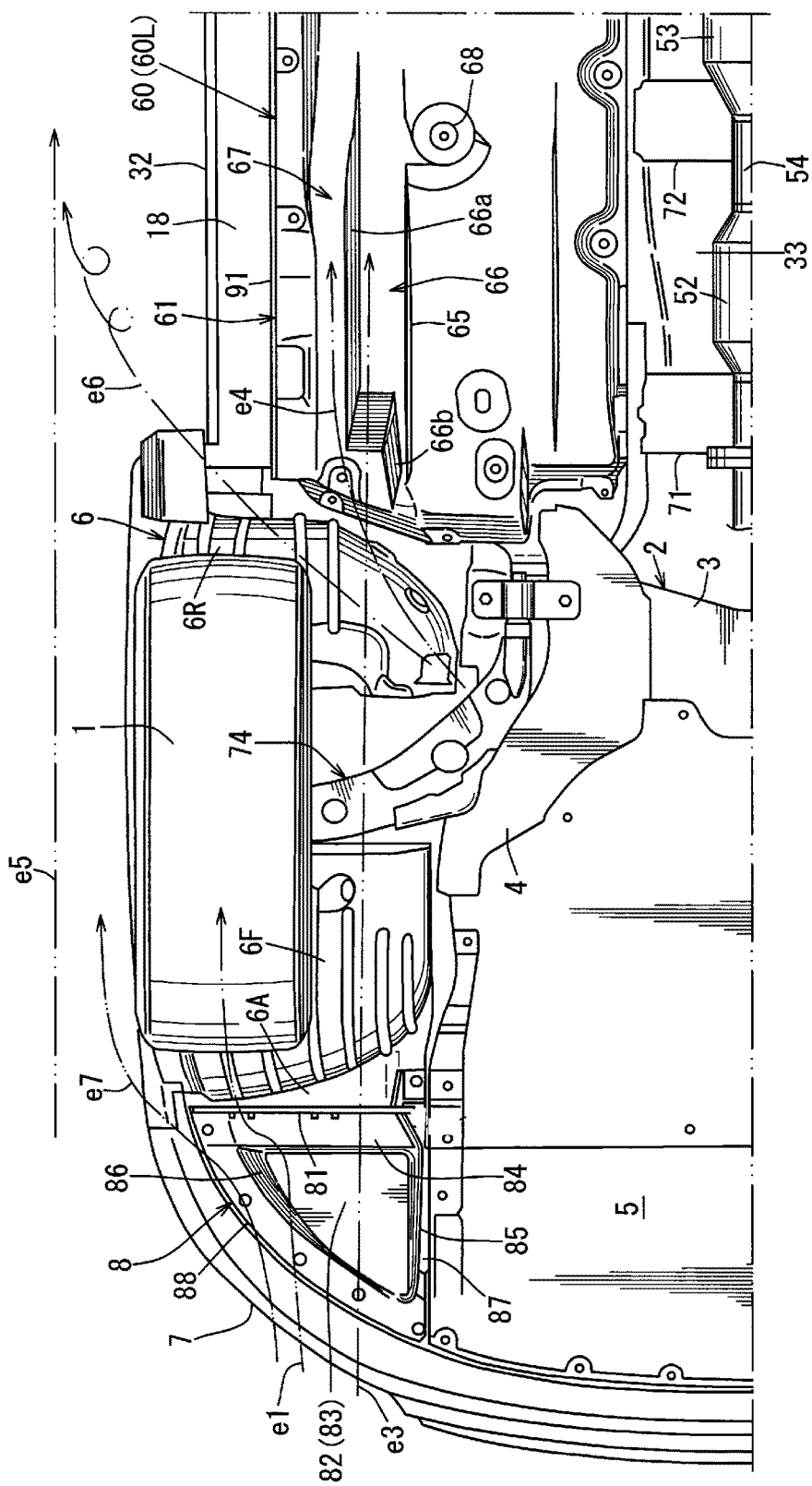
FIG. 7 is an enlarged bottom view of a major part of FIG. 1.
Figure 8:
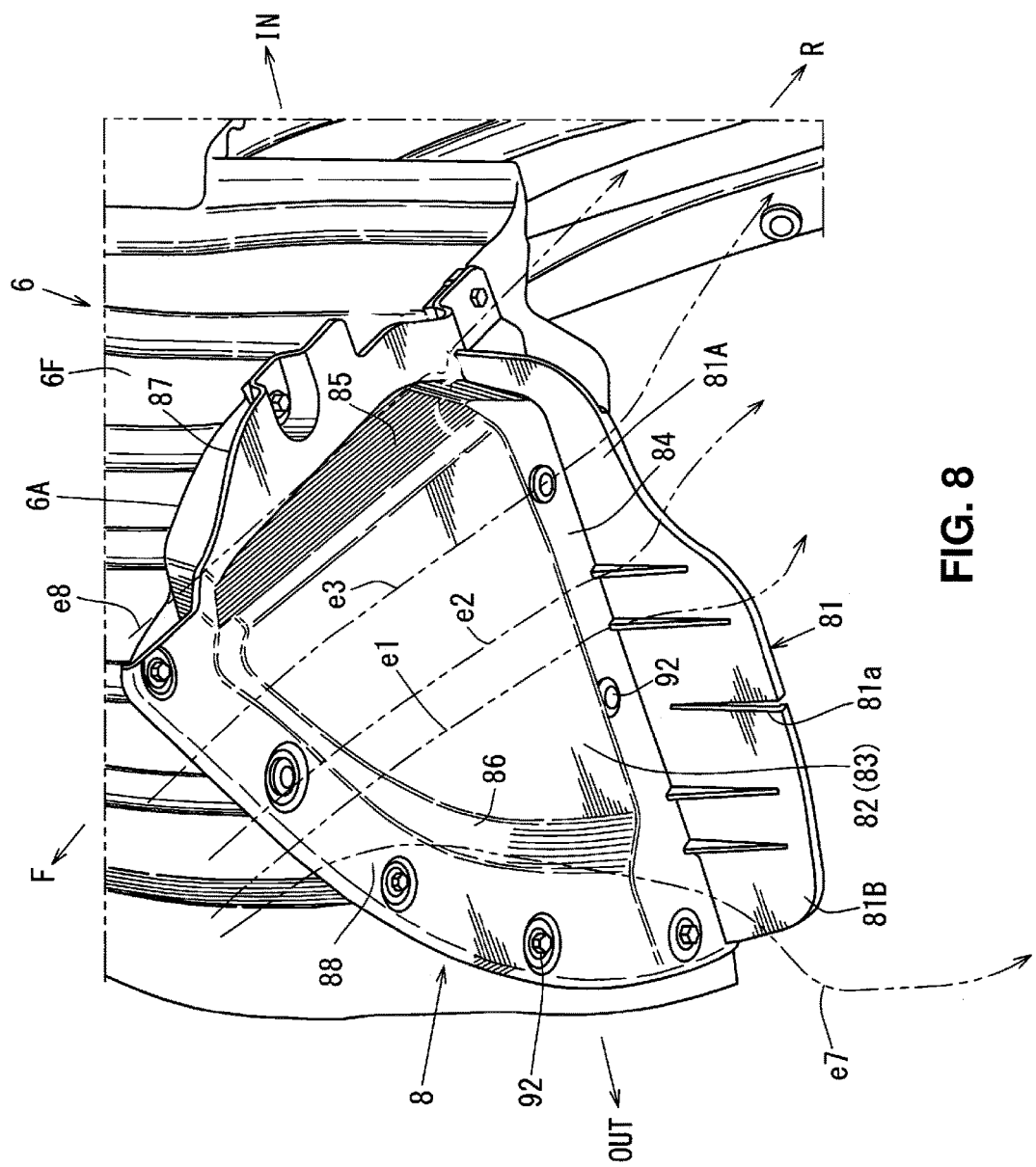
FIG. 8 is a perspective view of a deflector and its surrounding structure, when viewed from below.

Next, the underfloor structure of the automotive vehicle will be described specifically referring to FIGS. 7-11. FIG. 7 is an enlarged bottom view of a major part of FIG. 1, FIG. 8 is a perspective view of the deflector and its surrounding structure, when viewed from below, FIG. 9 is a front view of the structures shown in FIG. 8, FIG. 10 is a side view of the structures shown in FIG. 8, when viewed from an inward side, in a vehicle width direction, of the vehicle, and FIG. 11 is a sectional view taken along line C-C of FIG. 1.

Figure 10:
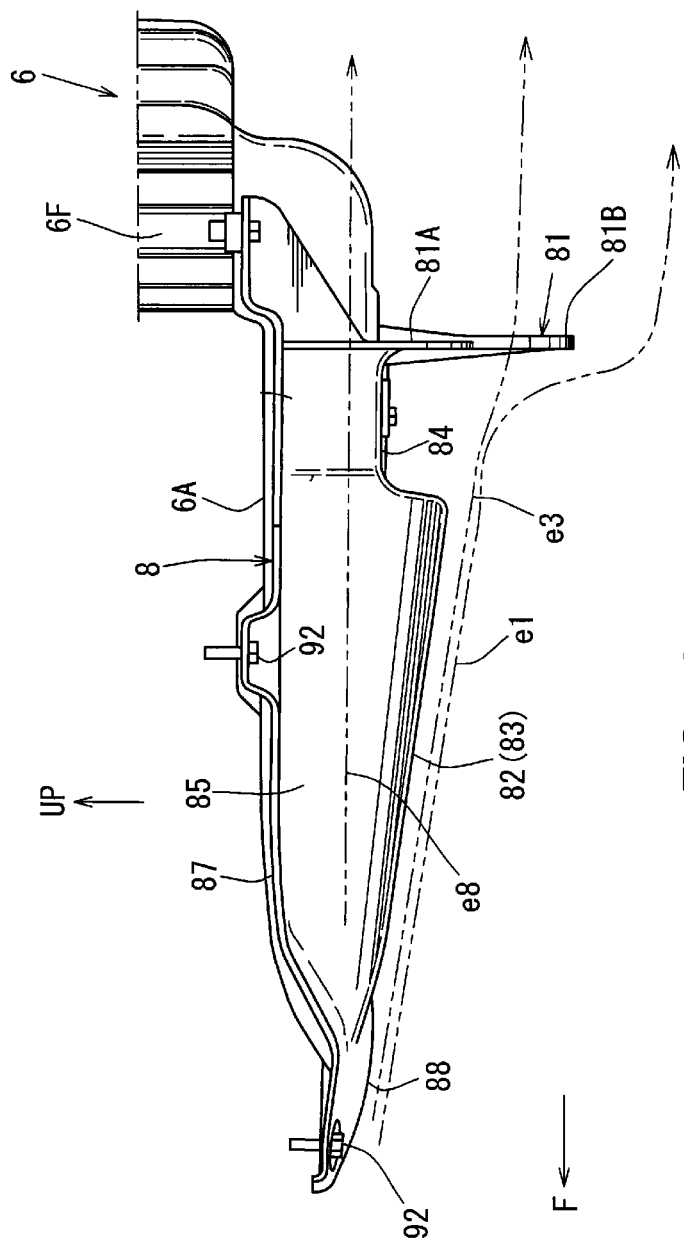
FIG. 10 is a side view of the structure shown in FIG. 8, when viewed from an inward side, in a vehicle width direction, of the vehicle.
Figure 11:
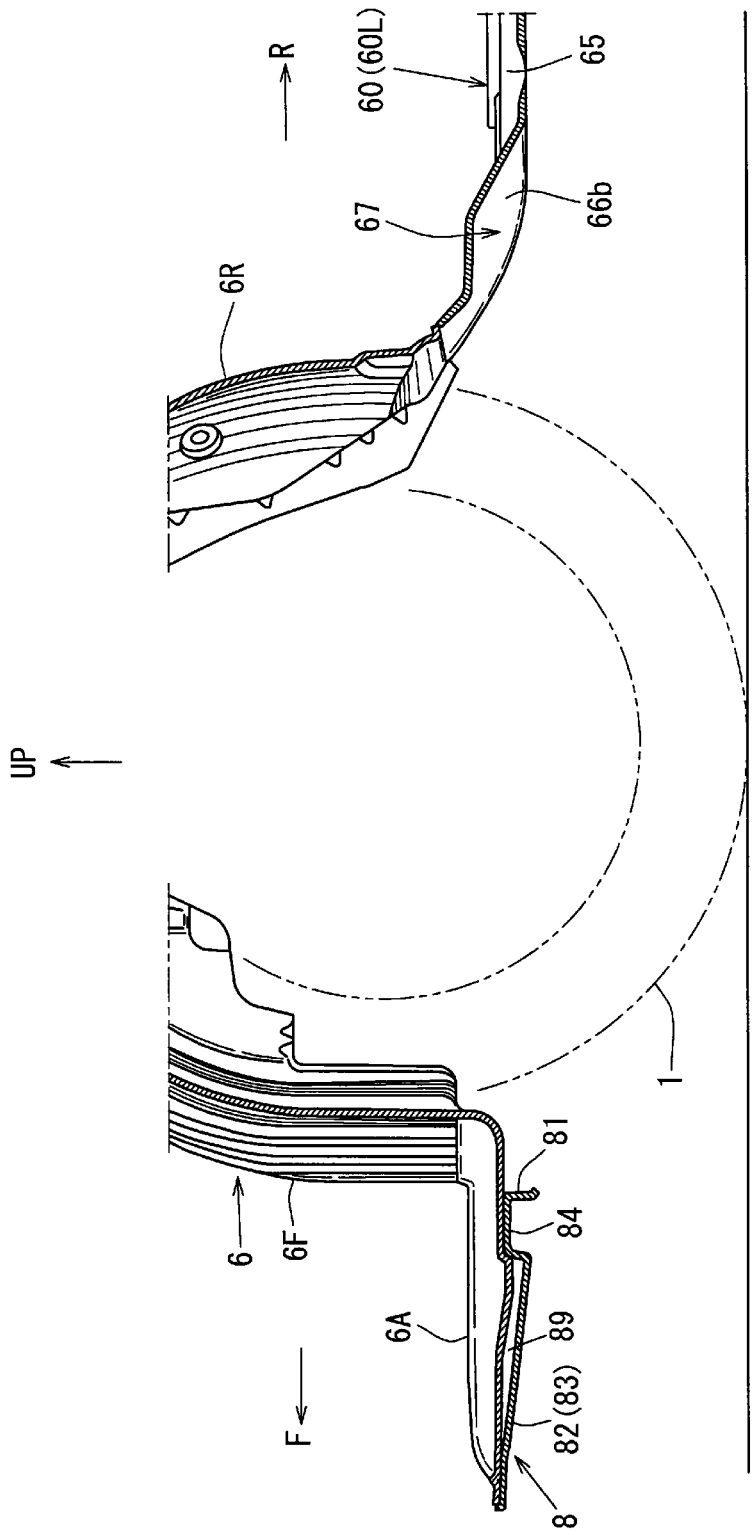
FIG. 11 is a sectional view taken along line C-C of FIG. 1.

As shown in FIGS. 7 and 11, the above-described splash shield 6 comprises a front-side member 6F which is positioned in front of the front wheel 1 and a rear-side member 6R which is positioned in back of the front wheel 1. A support piece 6A which extends forward from a lower end of the front-side member 6F and supports the above-described deflector 8 is formed integrally with the lower end of the front-side member 6F as shown in FIG. 11. The above-described deflector 8 comprises, as shown in FIGS. 7-10, a deflector vertical wall 81, a slant face portion 83 which is formed by a protrusion portion 82, a recess groove-shaped vehicle-body attachment portion 84, a side wall portion 85, a curve-shaped outer wall 86, an inside flange 87, and an outside flange 88, which are made of resilient members. Herein, the above-described side wall portion 85 is configured to extend rearward straightly from a front end of the slant face portion 83 on the inward side, in the vehicle width direction, of the slant face portion 83. The above-described curve-shaped outer wall 86, which forms part of the slant face portion 83, is configured such that an edge thereof curves outward and rearward from a front edge to a rearward-outward side edge at a position corresponding to the front of the front wheel 1. The above-described inside flange 87 is configured to extend inward from an upper end of the side wall portion 85. The above-described outside flange 88 is configured to continuously extend forward and outward from an upper end of the curve-shaped outer wall 86 in a curve shape in the plan view. Further, the above-described curve-shaped outer wall 86, which slants downward toward a central side of the protrusion portion 82, compatibly perform a function of guiding the underfloor airflow downward, avoiding the front of the front wheel 1, in cooperation with a lower face of the slant face portion 83 and another function of guiding the underfloor airflow outward and rearward, avoiding the front of the front wheel 1, as an outer wall.

The above-described deflector vertical wall 81 is configured, as shown in FIG. 7, such that it extends straightly in the vehicle width direction from a position corresponding to the front of the front wheel 1 to another position corresponding to an inward side, in the vehicle width direction, of the front wheel 1. The above-described slant face portion 83 is positioned in front of the deflector vertical wall 81, and this slant face portion 83 is also configured to extend in the vehicle width direction from the position corresponding to the front of the front wheel 1 to the position corresponding to the inward side, in the vehicle width direction, of the front wheel 1.

Figure 9:
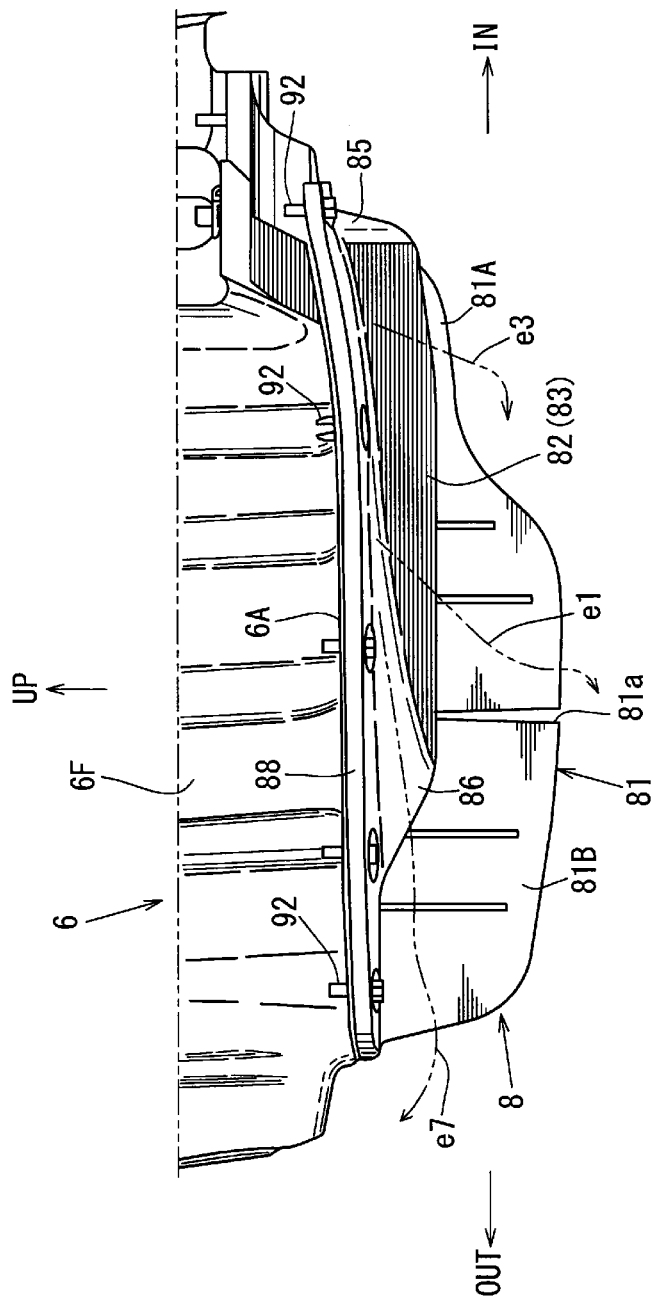
FIG. 9 is a front view of the structure shown in FIG. 8.

The slant face portion 83 is configured such that its inward side is of a flat (flat face) shape in the front sectional view as shown in FIG. 9 and it extends roughly straightly in the vehicle longitudinal direction, slanting with its front side being located at a higher level than its rear side in the side view as shown in FIG. 10. Further, the slant face portion 83 is constituted by the protrusion portion 82 which protrudes downward relative to the inside flange 87 and the outside flange 88 as shown in FIGS. 9 and 10, and this slant face portion 83 is configured such that when the deflector 8 is fixedly attached to the support piece 6A of the front-side member 6F of the splash shield 6, a space portion 89 is formed between the slant face portion 83 and the support piece 6A as shown in FIG. 11.

Further, as shown in FIG. 9, the deflector vertical wall 81 positioned behind the slant face portion 83 comprises a portion (inward-facing portion) 81A which faces an area located on the inward side of the front wheel 1 positioned in a vehicle's straightly-running state and another portion (front-facing portion) 81B which faces the front of the front wheel 1 positioned in the vehicle's straightly-running state (i.e., which overlaps the front wheel 1 positioned in the vehicle's straightly-running state in the front view), and these portions 81A, 81B of the deflector vertical wall 81 are configured such that the amount of downward protrusion of the inward-facing portion 81A is smaller than that of the front-facing portion 81B (i.e., such that a lower end portion of the inward-facing portion 81A is positioned at a higher level than that of the front-facing portion 81B). The downward-protrusion amount of the inward-facing portion 81A is slightly larger than the height (thickness) of the protrusion portion 82.

Thereby, as shown in FIG. 8, in an area facing the front of the front wheel 1, the slant face portion 83 guides the traveling air in such a manner that airflows e1, e2 flow downward and then hit against the deflector vertical wall 81, so that turbulence of the air overflowing the deflector 8 can be made properly small, thereby reducing the air resistance which may be caused by this turbulence. Meanwhile, in another area which is located inward, in the vehicle width direction, from the above-described area facing the front of the front wheel 1, an airflow e3 which has been guided downward by the slant face portion 83 can easily flow over the inward-facing portion 81A having the small downward-protrusion amount, without generating any large turbulence. Consequently, this airflow e3 straightly flows rearward on the inward side of the front wheel 1 in the wheel house, without decreasing its flowing speed. A flowing speed of an airflow e4 which leaks out of the engine room is slower than that the above-described airflow e3, so that this airflow e4 leaking out of the engine room is sucked to the airflow e3, thereby joining with this airflow e3 and flowing rearward together with this airflow e3. Accordingly, this airflow e4 leaking out of the engine room can suppress an occurrence of an airflow e6 flowing out from below the vehicle floor in back of the wheel house (this airflow e6 generally occurs in a conventional structure: see FIG. 7), so that any turbulence of an airflow e5 which flows on a vehicle-body side face (see FIG. 7) can be properly suppressed.

As shown in FIGS. 3, 7 and 11, the recess portion 67 configured to be recessed upward is provided at the position, in the vehicle width direction, which corresponds to the inward-facing portion 81A of the deflector 8 at the front portion of the undercover 60. Since this recess portion 67 causes a decrease of a local pressure of the under-flower airflow, the above-described joined airflows of the above-described airflow e3 and the above-described airflow e4 are drawn to this recess portion 67, so that this recess portion 67 becomes a flow passage of the joined airflows. Accordingly, the above-described suppression of the occurrence of the airflow e6 flowing out can be achieved surely.

Further, as shown in FIG. 8, since the above-described slant face portion 83 includes the curve-shaped outer wall 86 which extends from the front edge toward the outward-side edge, part of the traveling air, i.e., an airflow e7, can be smoothly guided outward and then rearward.

That is, as shown in FIGS. 7 and 8, the airflow e7 which is part of the airflows e1, e2, e7 facing the front of the front wheel 1 positioned in the vehicle's straightly-running state is guided outward by the curve-shaped outer wall 86, and the other airflows e1, e2 is guided downward by the slant face portion 83. And also, both the airflow e3 facing the area positioned inward of the front wheel 1 and an airflow e8 which flows down on the inward side of the side wall portion 85 are guided straightly rearward, without being bent inward.

Moreover, the above-described deflector vertical wall 81 is provided at a rear portion of the protrusion portion 82 via the recess groove-shaped vehicle-body attachment portion 84 extending in the vehicle width direction. The protrusion portion 82, the vehicle-body attachment portion 84, and the deflector vertical wall 81 are integrally formed, being made of resilient members. Thereby, the number of components/parts and the assembling steps are properly reduced. Further, since the respective elements 82, 84, 81 are made of the resilient members, the flexibility the deflector vertical wall 81 in a case in which these members interfere with a road surface is ensured. Additionally, since a slit 81a is formed at the deflector vertical wall 81, the flexibility of the deflector vertical wall 81 is further properly improved.

Also, as shown in FIG. 11, an upper portion of the protrusion portion 82 is configured to be hollow, so that this upper portion is easily deformed when something hits against this portion. Further, the restoration performance of this portion after being deformed is ensured because of the properties of the resilient member making this portion. Accordingly, the slant face portion 83 can be properly large-sized so as to guide the traveling air properly despite a risk of its interfering with the road surface.

Further, as shown in FIGS. 3 and 4, a partition portion 91 which protrudes downward relative to the above-described recess portion 67 is formed between the recess portion 67 and the outward side, in the vehicle width direction, of the vehicle body. In the present embodiment, this partition portion 91 comprises a lower joint flange portion of a hinge pillar inner 11 and a body outer panel 12 and a lower joint flange portion of the side sill outer 29 and the side sill inner 30. An outward end portion of the recess portion 67 which becomes an airflow passage of the above-described airflows e3, e4 is partitioned by the above-described partition portion 91, so that it can be more effectively suppressed that these airflows flowing out.

As shown in FIG. 8, the above-described deflector 8 is attached to the support piece 6A of the front-side member 6F of the splash shield 6 at the inside flange 87 and the outside flange 88 by means of plural attaching members 92, such as bolts and nuts or fasteners.

Reference character 74 denotes a lower arm of a front suspension in FIG. 7. In the drawings, an arrow F shows a vehicle forward direction, an arrow R shows a vehicle rearward direction, an arrow IN shows a vehicle inward direction, an arrow OUT shows a vehicle outward direction, an arrow UP shows a vehicle upward direction, and an arrow LO shows a vehicle downward direction.

As described above, the underfloor structure of the automotive vehicle comprises the deflector 8 provided in front of the front wheel house accommodating the front wheel 1 therein to protrude downward from the vehicle-body lower face so as to control the traveling air flowing into the front wheel house, wherein the deflector 8 comprises the protrusion portion 82 which protrudes downward, including the slant face portion 83 which slants obliquely rearward and downward, and the vertical wall portion 81 which is provided in back of the protrusion portion 82 to extend in the vehicle width direction, and the vertical wall portion 81 of the deflector 8 is configured such that the lower end portion thereof is positioned at the lower level than the rear end portion of the slant face portion 83 of the protrusion portion 82, the lower end portion of the part (see the inward-facing portion 81A) of the vertical wall portion 81 which is located inward, in the vehicle width direction, from the other part (see the front-facing portion 81B) of the vertical wall portion 81 which is located so as to overlap the front wheel 1 in the front view being positioned at the higher level than the lower end portion of the other part (see the front-facing portion 81B) of the vertical wall portion 81 located so as to overlap the front wheel 1 in the front view (see FIGS. 7, 8 and 9).

According to the present embodiment, at the position located so as to overlap the front wheel 1 in the front view, the slant face portion 83 guides the traveling air in such a manner that the airflows e1, e2 flow downward and then hit against the vertical wall portion 81, so that turbulence of the air overflowing the deflector 8 can be made properly small, thereby reducing the air resistance due to this turbulence. Meanwhile, at the position located inward, in the vehicle width direction, from the above-described position located so as to overlap the front wheel 1 in the front view, the airflow e3 which has been guided downward by the slant face portion 83 can easily flow over the inward-facing portion 81A, without generating any large turbulence, because the wall height of the inward-facing portion 81A is relatively small. Consequently, this airflow e3 straightly flows rearward on the inward side of the front wheel 1 in the wheel house, without decreasing its flowing speed. The flowing speed of the airflow e4 leaking out of the engine room is slower than that the airflow e3 guided downward by the slant face portion 83, so that the airflow e4 is sucked to the airflow e3, thereby joining with this airflow e3 and flowing rearward together with this airflow e3. Accordingly, this airflow e4 can suppress occurring of an airflow flowing out from below the vehicle floor in back of the wheel house, so that any turbulence of an airflow e5 which flows on the vehicle-body side face can be properly suppressed. As a result, reducing of the air resistance and suppressing of the turbulence can be compatibly achieved.

Herein, it is preferable that the lower end portion of the inward-facing portion 81A is positioned at a close level to the rear end portion of the slant face portion 83, like the present embodiment.

Further, in the present embodiment, the protrusion portion 82 includes the curve-shaped outer wall 86 which is configured to curve, retreating from the inward side thereof to the outward side thereof, and forms a periphery of the slant face portion 83.

According to the present embodiment, the airflow e7 which is part of the traveling air flowing down in the area facing the front of the front wheel 1 can be smoothly guided outward and then rearward by the curve-shaped outer wall 86.

Moreover, in the present embodiment, the sheet of splash shield 6 covers the front wheel house and a portion of the vehicle-body lower face which is positioned in front of the front wheel house, and the protrusion portion 82 is connected to the lower face of the front portion of the splash shield 6 at the peripheral portion thereof so as to form the space portion 89 between the splash shield 6 and the protrusion portion 82.

According to the present embodiment, the strength of the protrusion portion 82 (against an impact from below or the like) can be properly improved.

Additionally, in the present embodiment, the undercover 60 covers the lower face of the vehicle-body floor which is positioned in back of the front wheel house, and the undercover 60 includes the recess portion 67 extending rearward at its front portion which faces the front wheel house, the recess portion 67 being configured such that the portion of the undercover 60 which is located inward, in the vehicle width direction, from the front wheel 1 is partially recessed upward.

According to the present embodiment, since the recess portion 67 causes a decrease of local pressure of the underflower airflow, the airflows e3, e4 is drawn to this recess portion 67, so that this recess portion 67 becomes a flow passage of the joined airflows e3, e4. Accordingly, the airflow flowing out which may occur in the conventional vehicle structure can be surely suppressed.

Herein, it is preferable that the outward side, in the vehicle width direction, of the recess portion 67 is partitioned by the lower portion 91 of the side sill 28 extending in the vehicle longitudinal direction, like the present embodiment. Thereby, the above-described prevention of the airflow flowing out can be achieved surely.

The present invention should not be limited to the above-described embodiment, and any other modifications or improvements may be applied within the scope of a spirit of the present invention.

What is claimed is:

1. An under-floor structure of an automotive vehicle, comprising:
a deflector provided in front of a front wheel house accommodating a front wheel therein to protrude downward from a vehicle-body lower face so as to control traveling air flowing into the front wheel house,
said deflector comprises a protrusion portion which protrudes downward, including a slant face portion slanting obliquely rearward and downward, and a vertical wall portion which is provided in back of said protrusion portion to extend in a vehicle width direction,
a recess groove-shaped portion is located between the protrusion portion and the vertical wall portion in a vehicle longitudinal direction,
said vertical wall portion of the deflector is configured such that a lower end portion thereof is positioned at a lower level than a rear end portion of said slant face portion of the protrusion portion, the lower end portion of part of the vertical wall portion which is located inward, in the vehicle width direction, from another part of the vertical wall portion which is located so as to overlap the front wheel in a front view being positioned at a higher level than the lower end portion of said other part of the vertical wall portion located so as to overlap the front wheel in the front view, and
said recess groove-shaped portion is an attachment portion attaching to said vehicle-body lower face.

2. The under-floor structure of the automotive vehicle of claim 1, wherein said lower end portion of the part of the vertical wall portion located inward, in the vehicle width direction, from the other part of the vertical wall portion located so as to overlap the front wheel in the front view is positioned at a close level to said rear end portion of the slant face portion of the protrusion portion.

3. The under-floor structure of the automotive vehicle of claim 1, wherein said protrusion portion includes a hollow portion inside.

4. The under-floor structure of the automotive vehicle of claim 1, wherein an undercover covers a lower face of a vehicle-body floor which is positioned in back of the front wheel house, and said undercover includes a recess portion extending rearward at a front portion thereof which faces the front wheel house, the recess portion being configured such that a portion of the undercover which is partially recessed upward, and a front portion of the recess portion located closest to the front wheel in the vehicle longitudinal direction is located entirely inside of an inner side of the front wheel in the vehicle width direction.

5. The under-floor structure of the automotive vehicle of claim 4, wherein an outward side, in the vehicle width direction, of said recess portion is partitioned by a lower portion of a side sill extending in a vehicle longitudinal direction.

6. The under-floor structure of the automotive vehicle of claim 4, wherein a front end portion of the recess portion is located more inward than the front wheel.

7. An under-floor structure of an automotive vehicle, comprising:
a deflector provided in front of a front wheel house accommodating a front wheel therein to protrude downward from a vehicle-body lower face so as to control traveling air flowing into the front wheel house,
said deflector comprises a protrusion portion which protrudes downward, including a slant face portion slanting obliquely rearward and downward, and a vertical wall portion which is provided in back of said protrusion portion to extend in a vehicle width direction,
a recess groove-shaped portion is located between the protrusion portion and the vertical wall portion in a vehicle longitudinal direction,
said vertical wall portion of the deflector is configured such that a lower end portion thereof is positioned at a lower level than a rear end portion of said slant face portion of the protrusion portion, the lower end portion of part of the vertical wall portion which is located inward, in the vehicle width direction, from another part of the vertical wall portion which is located so as to overlap the front wheel in a front view being positioned at a higher level than the lower end portion of said other part of the vertical wall portion located so as to overlap the front wheel in the front view, and said protrusion portion includes a curve-shaped outer wall which is configured to curve, retreating from an inward side thereof to an outward side thereof, and forms a periphery of said slant face portion.

8. The under-floor structure of the automotive vehicle of claim 7, wherein an undercover covers a lower face of a vehicle-body floor which is positioned in back of the front wheel house, and said undercover includes a recess portion extending rearward at a front portion thereof which faces the front wheel house, the recess portion being configured such that a portion of the undercover which is partially recessed upward, and a front portion of the recess portion located closest to the front wheel in the vehicle longitudinal direction is located entirely inside of an inner side of the front wheel in the vehicle width direction.

9. An under-floor structure of an automotive vehicle, comprising:
   a deflector provided in front of a front wheel house accommodating a front wheel therein to protrude downward from a vehicle-body lower face so as to control traveling air flowing into the front wheel house,
   wherein said deflector comprises a protrusion portion which protrudes downward, including a slant face portion slanting obliquely rearward and downward, and a vertical wall portion which is provided in back of said protrusion portion to extend in a vehicle width direction, said vertical wall portion of the deflector is configured such that a lower end portion thereof is positioned at a lower level than a rear end portion of said slant face portion of the protrusion portion, the lower end portion of part of the vertical wall portion comprises an inside lower end portion and an outside lower end portion, the inside lower end portion which is located inward, in the vehicle width direction, from the outside lower end portion which is located so as to overlap the front wheel in a front view, being positioned at a higher level than the outside lower end portion, a front end of the slant face portion on the inward side located so as to overlap the inside lower end portion or located more inward in the vehicle width direction, and a side wall portion of the protrusion portion is configured to extend rearward straightly from the front end of the slant face portion on the inward side in the vehicle width direction.

10. The under-floor structure of the automotive vehicle of claim 9, wherein the outside lower end portion is located below an extension line of the slant face portion in the vehicle side view, the inside lower end portion is located the same as or above the extension line, and the front end of the slant face portion on the inward side located the same as or inward from an inward end portion of the inside lower end portion in the vehicle width direction.

* * * * *